and said
United States Patent
Noda

[15] 3,688,337
[45] Sept. 5, 1972

[54] SCRAPING DEVICE FOR REMOVING THE SURFACE OF PRECOAT LAYER IN THE PRECOAT-TYPE ROTARY DRUM VACUUM FILTER

[72] Inventor: Ichiro Noda, Sakaide, Japan
[73] Assignee: Ishigaki Kiko Co., Ltd., Sakaide, Japan
[22] Filed: Dec. 8, 1970
[21] Appl. No.: 96,051

[52] U.S. Cl. ............................... 15/256.53, 210/376
[51] Int. Cl. .......................................... B01d 33/36
[58] Field of Search .............................. 15/256.53; 210/369–375, 376, 391–398, 396; 100/174, 112, 158 R; 162/281; 101/425, 157, 169, 423

[56] References Cited

UNITED STATES PATENTS

| | | | |
|---|---|---|---|
| 2,178,069 | 10/1939 | Crafts | 101/157 |
| 2,120,455 | 6/1938 | Barnebl | 15/256.51 X |
| 2,323,983 | 7/1943 | Edmondson | 15/256.53 X |
| 2,009,382 | 7/1935 | Blaufuss | 210/396 X |

FOREIGN PATENTS OR APPLICATIONS

| 559,827 | 7/1958 | Canada | 15/256.51 |

*Primary Examiner*—Leon G. Machlin
*Attorney*—Dawson, Tilton, Fallon & Lungmus

[57] ABSTRACT

A scraping device for removing the surface of precoat layer in the precoat-type rotary drum vacuum filter wherein carriages for a scraping blade are mounted on the machine- or filter-frame in such a manner that said carriages can be moved in the forward and backward directions toward the rotary drum and in the left and right directions along the axis of the drum, and said carriages are reciprocated in the latter directions in connection with the advancing movement of the carriages by suitable driving means and a cooperatively moving device whereby the scraping blade is reciprocated along the axis of the rotary drum when the blade is advanced toward the drum so as to scrape off the surface of the precoat layer smoothly.

4 Claims, 4 Drawing Figures

3,688,337

SCRAPING DEVICE FOR REMOVING THE SURFACE OF PRECOAT LAYER IN THE PRECOAT-TYPE ROTARY DRUM VACUUM FILTER

BACKGROUND

This invention relates to a scraping device for removing the surface of precoat layer in the precoat-type rotary drum vacuum filter, and more particularly to a scraping device of the above type which facilitates smooth scraping of the surface of precoat layer and can be formed compactly.

In a precoat-type rotary drum vacuum filter wherein the lower portion of a rotary drum having a precoated filtering layer, so-called precoat layer, of diatomaceous earth or the like on the circumference of the drum is immersed in a slurry tank accomodating slurry or mixture of finely grained solid particles and liquid, and the pressure in the rotary drum is brought depressed, so that solid particles in the slurry adheres on the surface of the precoat layer so as to form cakes, and liquid is brought into the drum by drawing under a depressed pressure or vacuum through said precoat layer whereby purified liquid is obtained, choking of said precoat layer due to the cakes adhered on the layer is caused as filtering operation proceeds so that the surface of the precoat layer must be scraped off or removed together with the adhered cakes continuously or intermittently so as to remove said choking of the precoat layer. In the continuous scraping-off of said surface the adhered cakes are scraped off continuously together with a thin surface portion of the precoat layer by using a scraper or scraping blade which is advanced toward the drum continuously with a very small speed of advance whereby slurry always meets a freshed surface of the precoat layer, whereas, in the intermittent scraping-off of said surface, the adhered cakes are intermittently scraped off together with a thin surface portion of the precoat layer by a continuously advanced scraper until the choking of the layer becomes removed at each time when the choking of the precoat layer is detected by, for example as shown in Japanese Patent Publication No. 15,944/64, a definite decrease of the pressure in the rotary drum whereby the filter is brought intermittently into such a state where filtering operation proceeds with a high efficiency. In the precoat-type rotary drum vacuum filter according to the prior art, scraping device for removing the surface of the precoat layer is so constructed that the edge of a scraping blade is advanced only toward the precoat layer so that the surface of said layer is removed only by pressing the edge of said blade against the surface of the precoat layer on the rotary drum. Generally speaking, however, a blade cuts a substance intended to cut well when the edge of the blade is moved in the transverse direction of the edge but does not cut the substance well when the edge is only pressed against said substance or when the edge is moved only in the direction toward the substance, that is also true in the concerned case when the surface of precoat layer is intended to cut off or scrape off with a blade. In addition, the surface of a precoat layer is often put into a picked off, not scraped-off, state when a blade is advanced only toward the precoat layer due to the fact that the surface portion of the layer intended to remove is very thin. Obviously, such a surface state of the precoat layer is very undesirable.

SUMMARY

Accordingly, the primary object of the present invention is to provide an improved scraping device for removing the surface of precoat layer in the precoat-type rotary drum vacuum filter which facilitates a smooth scraping of the surface of the precoat layer.

The other object of the present invention is to provide an improved scraping device for removing the surface of precoat layer in the filter of the aforementioned-type which can be constructed in a compact fashion.

The scraping device for removing the surface of precoat layer is so constructed that carriages for a scraping blade are mounted on the filter frame in such a manner that said carriages can be moved in the forward and backward directions toward the rotary drum and also in the left and right directions along the axis of said drum, there is provided driving means for moving said carriages in the former directions, and there is arranged between said driving means and the carriages a cooperatively moving device which reciprocates the carriages in the latter directions in connection with the advancing movement of the carriages toward the rotary drum when said carriages are being advanced by the driving means. By reciprocating the scraping blade in the left and right directions along the axis of the rotary drum in connection with the advancing movement of said blade toward the rotary drum, the surface portion of the precoat layer is scraped off smoothly whereby a fresh and smooth surface of the precoat layer is always obtained.

DESCRIPTION OF THE DRAWING

Other and preferred features and attendant advantages of the present invention will become more readily apparent from the following description, given by way of example, in connection with the accompanying drawings in which.

DESCRIPTION OF SPECIFIC EMBODIMENTS

Figure 1:
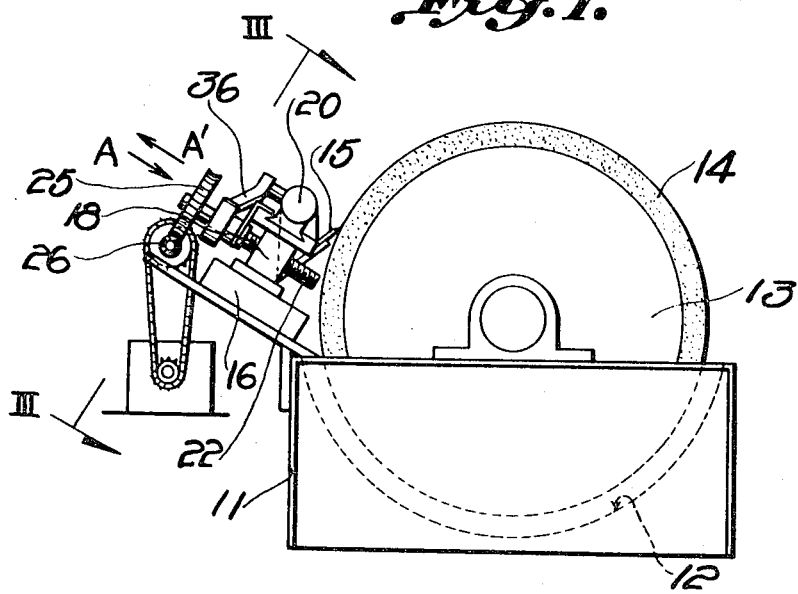
FIG. 1 is an elevational side view of a precoat-type rotary drum vacuum filter in which one embodiment of the scraping device for removing the surface of precoat layer according to the present invention is employed.

Referring now to the drawings, there is shown a preferred embodiment of the scraping device for removing the surface of precoat layer together with the overall filter. As is usual, a rotary drum 13 having a precoated filtering layer 14, so-called precoat layer, of diatomaceous earth or the like on the circumference is rotably mounted on the machine- or filter-frame 11 and the lower portion of said drum 13 is immersed in a slurry tank 12. In the filter, there is provided a scraping blade 15 for removing the surface of the precoat layer 14 which blade 15 is reciprocated in the left and right directions along the axis of the rotary drum 13 as the blade 15 is advanced toward the drum 13 as detailed hereinafter.

At the front of the frame 11, there are fixedly arranged a pair of declined guiding members 16 each of which is provided with a dovetail groove 17 running toward the drum 13 on the upper face of each member 16 respectively. A pair of sliding members 18 with dovetails 18a on the lower faces thereof are slidably mounted on the guiding members 16 in such a manner that said dovetails 18a are slidably received by the dovetail grooves 17 of the guiding members 16, whereby the sliding members 18 can be brought close to and apart from the rotary drum 13 with being guided by the members 16. Further, a pair of dovetail grooves 19 running along the axis of the rotary drum 13 are provided on the upper faces of the sliding members 18 at both sides thereof and said grooves 19 receive dovetails 20a provided on the lower faces of a pair of carriages 20 for the scraping blade 15 to which said blade is secured. Therefore, the scraping blade 15 is advanced toward or retreated apart from the rotary drum 13 along arrows A or A' when the sliding members 18 are advanced or retreated on the guiding members 16 and is moved in the left and right directions shown with arrows B and B' along the axis of the drum 13 when the carriages 20 are moved in said directions of arrows B and B' on the sliding members 18. Each of the carriages 20 consists of said dovetail 20a, a cylinder 20b bridged between a pair of sliding members 18, an arm 20c projected on the cylinder 20b and a plate member 20d supported by the leg of the arm 20c, and the scraping blade 15 is secured to the carriages at said plate members 20d with screws 21.

Figure 2:
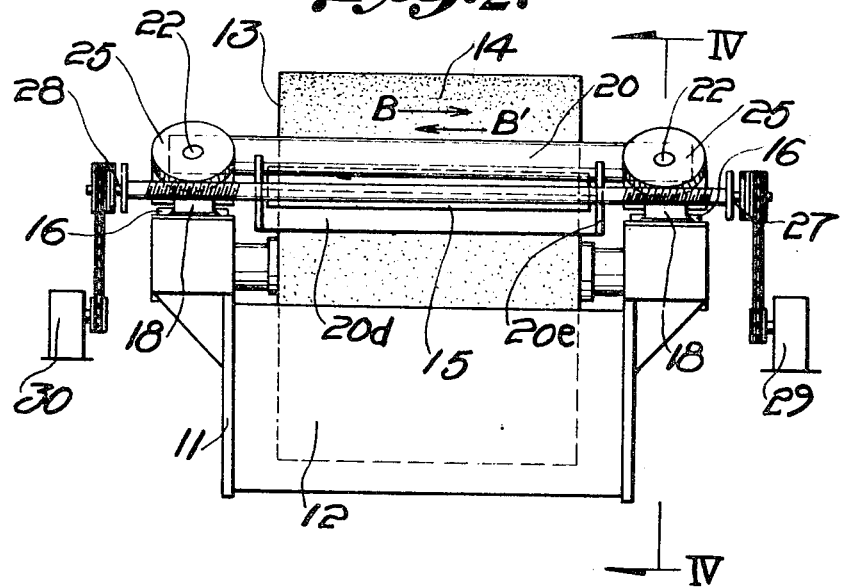
FIG. 2 is an elevational front view of the filter shown in FIG. 1.
Figure 3:
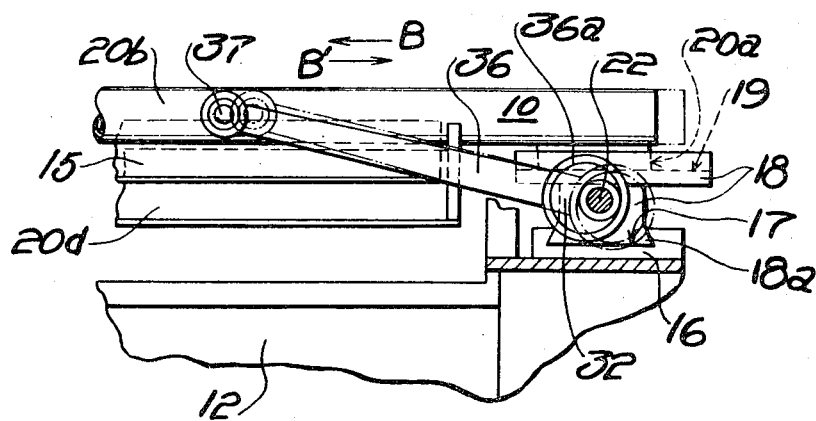
FIG. 3 is an enlarged sectional view, partially out away, taken along line III—III of FIG. 1.
Figure 4:
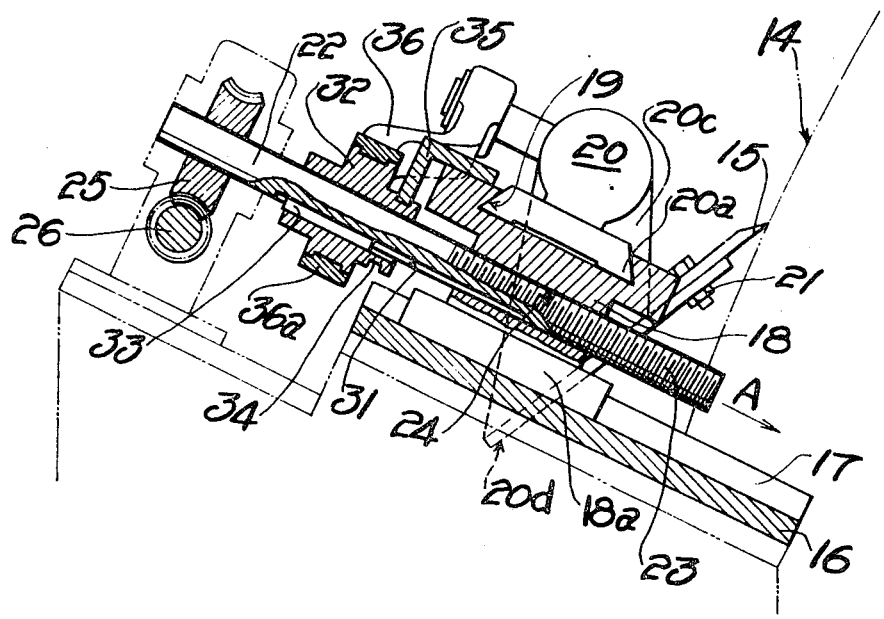
FIG. 4 is an enlarged sectional view taken along line IV—IV of FIG. 2.

A driving shaft 22 with a screwed portion 23 is inserted into screwed bore 24 perforated through one of the sliding members 18 which is positioned at the right hand of FIG. 2. A pair of worm wheels 25 are secured to the both ends of said driving shaft 22. Said wheels 25 are engaged with a worm shaft 26 which is selectively connected to a speed-reduced forwardly driving source 29 or a backwardly driving source 30 through clutches 27 or 28.

On the driving shaft 22, there is provided a key way or groove 31. An eccentric cylinder 32 is slidably mounted on the driving shaft 22 and is prevented the relative rotation to said shaft 22 by the sliding key received with the key way 31. The free end of a guiding arm 35 is slidably received with an annular groove 34 provided on the boss of the cylinder 32 so as to advance or retreat the eccentric cylinder 32 on and along the shaft 22 with following the advancing or retreating movement of the sliding member 18. There is provided a rod 36 with a ring portion 36a at the base end thereof. The base end of the rod 36 is rotably connected to the eccentric cylinder 32 by putting the ring portion 36a over the circumference of the cylinder 32 and the front end of said rod 36 is rotably connected to a suitable portion of the carriages 20 with a pivot 37.

A similar driving shaft 22 is also screwed through the other sliding member 18 on the left hand of FIG. 2, so that the left driving shaft 22 is rotated together with the right driving shaft 22 by rotating the left worm shaft 27 engaging with the left worm wheel 25 on the left shaft so as to advance or retreat the right and left sliding members 18 with a same degree at the same time. However, means for moving the carriages 20 in the left and right directions are not required and never provided at this left driving shaft 22.

When the worm shafts 26 are rotated, the sliding members 18 are advanced or retreated with the rotation of the driving shafts 22 so as to bring the carriages 20 close to or apart from the rotary drum 13 and, at the same time, the carriages 20 are reciprocated in the left and right directions along the axis of the drum 13 through the rod 36 owing to the rotation of the eccentric cylinder 32 on the right driving shaft 22.

In the scraping device according to the present invention, it is preferable to construct the driving means for the carriages 18 in such a way that the sliding members 18 are advanced slowly when the worm shaft 27 is connected to the forwardly driving source 29 with a reduced speed and said members 18 are retreated fast when the shaft 27 is connected to the backwardly driving source 30 with a high speed. When the worm shaft 27 is rotated so as to advance the carriages 18 during a filtering operation, the scraping blade 15 is advanced toward the rotary drum 13 with keeping the edge thereof in contact with the surface of the precoat layer 14 and, at the same time, the blade 15 is reciprocated in the left and right directions along the axis of the drum 13 whereby a thin surface portion of the precoat layer 14 is scraped off continuously in a very smooth manner.

Further, in the scraping device according to the present invention wherein the scraping blade 15 is reciprocated in the left and right directions during the advancing movement thereof, it is very easy to give the scraping blade 15 the required amount of movement in the left and right directions, namely the required total amount of said movement in relation to the amount of advancing movement of the blade even when the amplitude of the reciprocating movement of the blade is small. Therefore, only by giving a suitable amount of the reciprocating movement to the blade, the scraping blade 15 scrapes off the surface of the precoat layer very smoothly owing to the presence of said reciprocating movement because the scraping effect of the blade is never changed by the amplitude of the reciprocating movement, so that the protruded portions of the scraping device in the left and right hands of the filter can be made small whereby the device can be constructed in a compact fashion in spite of the smooth scraping effect of the device.

Having now described the invention and having exemplified the manner in which it can be carried into practice, it is apparent to those skilled in the art that innumerable variations, applications, modifications, and extensions of the basic principles involved may be made without departing from the spirit of the present invention. The invention is, therefore, to be limited only by the scope of the appended claims.

I claim:

1. A scraping device for removing the surface of precoat layer in a precoat-type rotary drum vacuum filter having a frame, comprising a blade carriage and a scraping blade carried by the blade carriage and having a scraping edge extending parallel to the axis of the rotary drum, first support means on the frame for supporting the blade carriage for straight slidable movement parallel to the axis of the rotary drum, second support means on the frame for supporting the blade carriage for straight slidable movement parallel to a plane extending perpendicularly to the axis of the rotary drum, driving means for advancing the blade carriage and the blade along the second support means toward the rotary drum, and reciprocating means operatively connected to the blade carriage and to the driving means for reciprocating the blade carriage on the first support means parallel to the axis of the rotary drum when the driving means advances the carriage on the second support means, the driving means including a rotary drive shaft rotatably mounted on the frame and connected to the blade carriage, advancing means on the shaft for advancing the blade carriage along the second support means toward the rotary drum as the drive shaft rotates in one direction, the reciprocating means including a rod pivotally connected to the blade carriage and eccentric means connecting the rod to the drive shaft, the eccentric means reciprocating the rod as the drive shaft rotates in said one direction whereby the blade carriage is reciprocated on the first support means.

2. The scraping device of claim 1 in which the eccentric means includes a cylinder having an eccentric bore which receives the drive shaft, the cylinder being secured against rotational movement relative to the drive shaft, the rod including a ring at one end thereof which rotatably receives the cylinder.

3. The scraping device of claim 1 in which the advancing means on the shaft includes screw threads on the shaft which are threadedly engaged with screw threads on the blade carriage.

4. The scraping device of claim 1 including a clutch operatively connecting the drive shaft to a forwardly driving source with a reduced speed and a rearwardly driving source with a high speed.

* * * * *